US011179993B2

(12) United States Patent
Davter et al.

(10) Patent No.: US 11,179,993 B2
(45) Date of Patent: Nov. 23, 2021

(54) CABIN PRESSURIZATION SYSTEM FOR AGRICULTURAL MACHINES WITH FILTRATION SYSTEM

(71) Applicant: DENSO THERMAL SYSTEMS S.p.A., Poirino (IT)

(72) Inventors: Massimo Davter, Turin (IT); Leone Contento, Turin (IT)

(73) Assignee: DENSO THERMAL SYSTEMS S.P.A., Turin (IT)

( * ) Notice: Subject to any disclaimer, the term of this patent is extended or adjusted under 35 U.S.C. 154(b) by 276 days.

(21) Appl. No.: 15/559,563

(22) PCT Filed: Mar. 17, 2016

(86) PCT No.: PCT/IB2016/051497
§ 371 (c)(1),
(2) Date: Sep. 19, 2017

(87) PCT Pub. No.: WO2016/147135
PCT Pub. Date: Sep. 22, 2016

(65) Prior Publication Data
US 2018/0043746 A1 Feb. 15, 2018

(30) Foreign Application Priority Data

Mar. 19, 2015 (IT) .................... 102015000009102

(51) Int. Cl.
*B60H 1/00* (2006.01)
*B60H 3/06* (2006.01)
(52) U.S. Cl.
CPC ....... *B60H 1/00378* (2013.01); *B60H 3/0633* (2013.01); *B60H 2003/0683* (2013.01)
(58) Field of Classification Search
CPC .............. B60H 1/00378; B60H 3/0633; B60H 2003/0683

(Continued)

(56) References Cited

U.S. PATENT DOCUMENTS 3,555,846 A 1/1971 Harbeck et al.
3,626,713 A * 12/1971 Venable ............ B60H 1/00378
62/187

(Continued)

FOREIGN PATENT DOCUMENTS

WO 2015/159248 A1 10/2015
WO 2015159248 A1 10/2015

OTHER PUBLICATIONS

International Search Report for PCT/IB2016/051497 dated Jun. 24, 2016.

*Primary Examiner* — Allen R Schult
(74) *Attorney, Agent, or Firm* — Arent Fox LLP; Michael Fainberg (57) ABSTRACT

Cabin air treatment apparatus for an agricultural machine, comprising at least an external air inlet, a filtration system, an HVAC system, and a cabin air supply outlet. The apparatus further comprises a hermetically closed box inside which the HVAC system is housed, the box having a levelling opening for placing the box into communication with a cabin of the agricultural machine to level a pressure inside the box with a pressure inside the cabin. The filtration system comprises a filter for effecting a filtration of at least one among dust, aerosols and vapours, arranged at an external air inlet formed on the box, and an air inlet duct arranged downstream of the filter and provided with a selecting valve having a first outlet connected to the HVAC system, and a second outlet connected to a fan of a condensation system, through a cleaning duct.

5 Claims, 6 Drawing Sheets (58) Field of Classification Search
USPC .......................................................... 454/136
See application file for complete search history.

(56) References Cited

U.S. PATENT DOCUMENTS

| | | | |
|---|---|---|---|
| 4,467,706 A | 8/1984 | Batcheller et al. | |
| 5,184,474 A * | 2/1993 | Ferdows | B60H 1/00371 |
| | | | 62/244 |
| 2007/0131408 A1* | 6/2007 | Zeigler | B60H 1/00378 |
| | | | 165/240 |
| 2018/0178633 A1* | 6/2018 | Falagario | B62D 33/0612 |

* cited by examiner

CABIN PRESSURIZATION SYSTEM FOR AGRICULTURAL MACHINES WITH FILTRATION SYSTEM

CROSS-REFERENCE TO RELATED APPLICATIONS

This application is the U.S. National Stage Application of International Patent Application No. PCT/IB2016/051497, filed on Mar. 17, 2016, which claims priority to Italian Patent Application No. IT102015000009102, filed on Mar. 19, 2015, the contents of each of which is incorporated herein by reference in its entirety.

BACKGROUND

The present invention relates to a cabin air treatment apparatus for an agricultural machine, comprising at least an external air inlet, a filtration system connected downstream of the external air inlet, an HVAC system connected downstream of the filtration system, and a cabin air supply outlet connected downstream of the HVAC system, as well as a condensation system comprising a condenser connected to an evaporator of the HVAC system, and a fan associated to the condenser.

Conventional air treatment apparatus for agricultural machines provide dust filtration, but aerosols and vapours can, in practice, still flow freely into the vehicle cabin. As a general rule, these known apparatus are inflexible, and it is difficult to use them to achieve satisfactory levels of pressurization in the cab, in particular if the latest standards are borne in mind. There is also the problem of isolating the treatment apparatus to avoid penetration by contaminants, which requires accurate design of the sealing elements of the individual components of the apparatus.

SUMMARY

The invention therefore proposes an apparatus of the type defined initially, further comprising a hermetically closed box inside which the HVAC system is housed, said box having a levelling opening for placing the box into communication with a cabin of the agricultural machine to level a pressure inside the box with a pressure inside the cabin,
wherein said at least one external air inlet comprises an external air inlet formed on the box,
wherein the condensation system is arranged outside of said box, and
wherein the filtration system comprises:
a filter for effecting a filtration of at least one among dust, aerosols and vapours, arranged at the external air inlet, and
an air inlet duct arranged directly connected downstream of the filter and provided with selecting valve means having a first outlet connected to the HVAC system, and a second outlet connected to the fan of the condensation system, through a cleaning duct.

According to the invention, the HVAC system is therefore housed within a pressurized box, at the same pressure as that present within the cabin. The pressurization in the environment of the box surrounding the treatment apparatus prevents external contaminants from coming into contact with the various components of the HVAC system and with the fan. Consequently, it is unnecessary to have every individual component made so as to be protected from contaminant penetration; only the parts of the box communicating with the outside, particularly the air inlets with their filters, have to be configured for this purpose. This obviously provides a high degree of simplification as regards construction, resulting in cost savings, as well as greater safety in terms of operator protection. By means of the cleaning duct and the fan of the condensation system, it is possible to carry out a cleaning operation on the filter, by means of which contaminants possibly present downstream of the filter are discharged directly to the outside, preventing them from reaching the HVAC system and from there the cabin.

Preferred embodiments of the invention are defined in the dependent claims, which are to be considered as an integral part of the present description.

BRIEF DESCRIPTION OF THE DRAWINGS

Further characteristics and advantages of the apparatus according to the invention will be made clearer by the following detailed description of an embodiment of the invention, given with reference to the attached drawings which are provided purely as non-limiting illustrations, in which.

DETAILED DESCRIPTION

Figure 1:
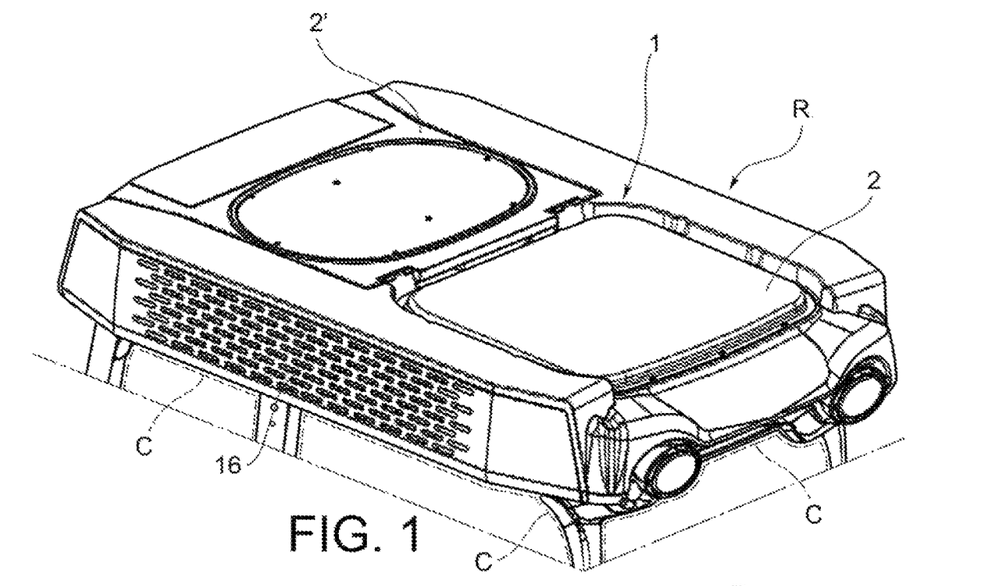
FIG. 1 is a perspective view of a roof of an agricultural machine provided with a treatment apparatus according to the invention.
Figure 2A:
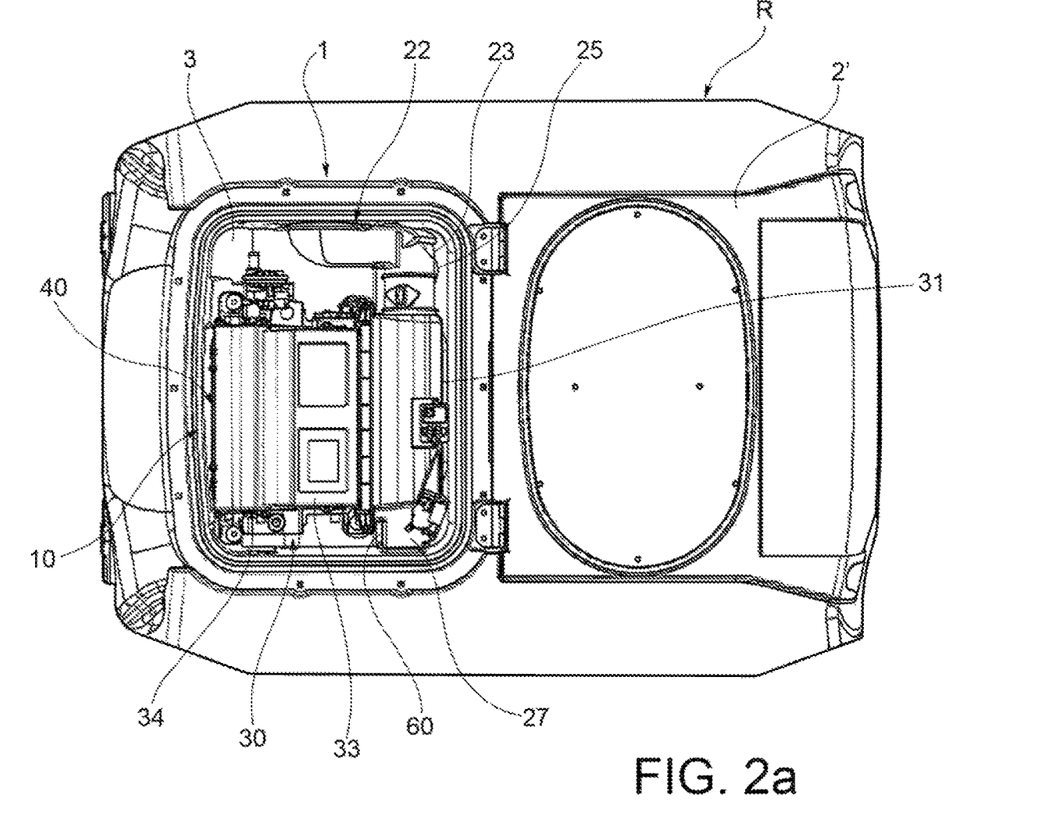
FIG. 2a is a plan view of the roof of FIG. 1, with the cover removed.

FIGS. 1 and 2a show a roof R of an agricultural machine, while the letter C indicates an area to be occupied by the cabin of the agricultural machine, under the roof R. According to the regulations on exposure to hazardous substances, the cabin is required to be isolated from the external environment (at least in the higher safety classes).

Figure 2B:
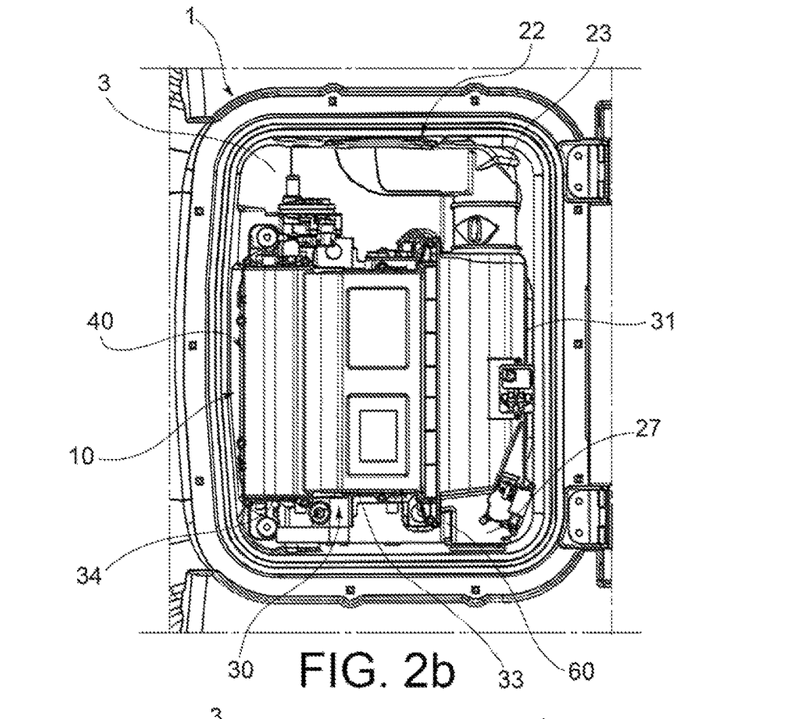
FIG. 2b is an enlarged plan view of a part of the roof with the cover removed.

A box 1, hermetically closed by a cover 2, is placed on the roof R of the agricultural machine. FIG. 2a shows the roof R with the box 1 from which the cover 2 has been removed; in particular, a gasket placed along a perimetric edge of the box is visible. As can also be seen in FIG. 2b, the box 1 forms a compartment 3, in which a part of an air treatment apparatus 10 according to the invention is placed. FIGS. 1 and 2a further show a second cover 2' which covers a second compartment 3' (visible in FIGS. 6 to 9), inside of which another part of the air treatment apparatus is arranged.

The air treatment apparatus essentially comprises a first and a possible second external air inlet 11, 16, formed through the walls of the box 1, through which inlets air is drawn from the external environment, a filtration system 20 connected downstream of the external air inlets 11, 16, an HVAC system 30 connected downstream of the filtration system 20, and a cabin air supply outlet 40 connected downstream of the HVAC system 30 (visible in FIG. 3), through which treated air is supplied to the cabin C at a pressure greater than the pressure of the external environment. The air treatment apparatus further comprises a condensation system 70 arranged inside the second compartment 3'.

Figure 4:
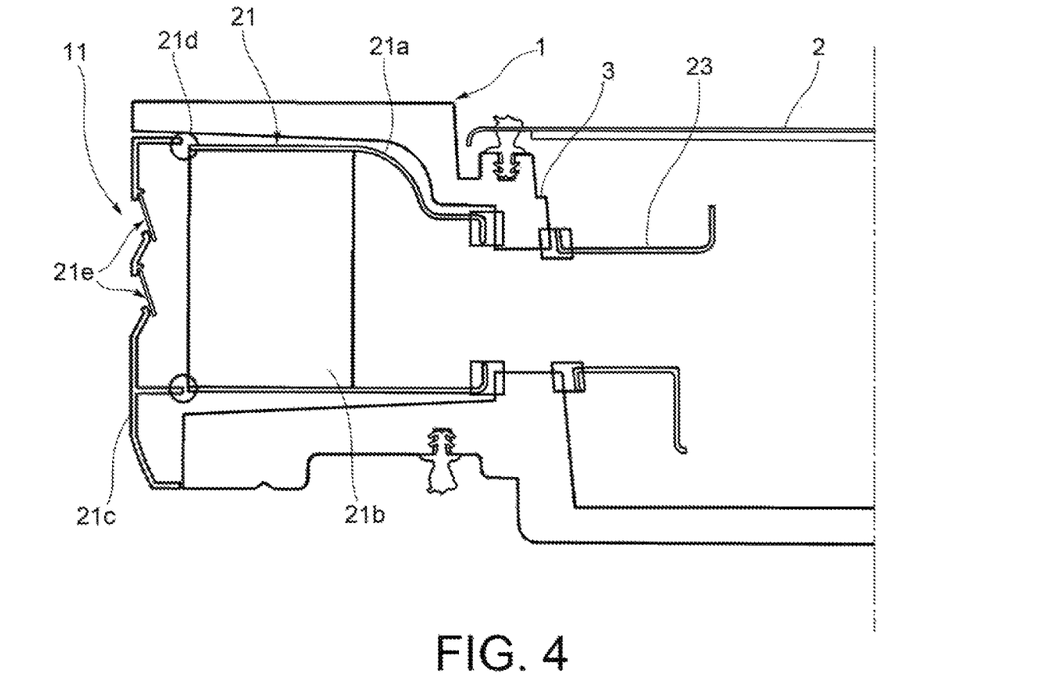
FIG. 4 is a sectional view of a first external air inlet of the treatment apparatus.
Figure 6:
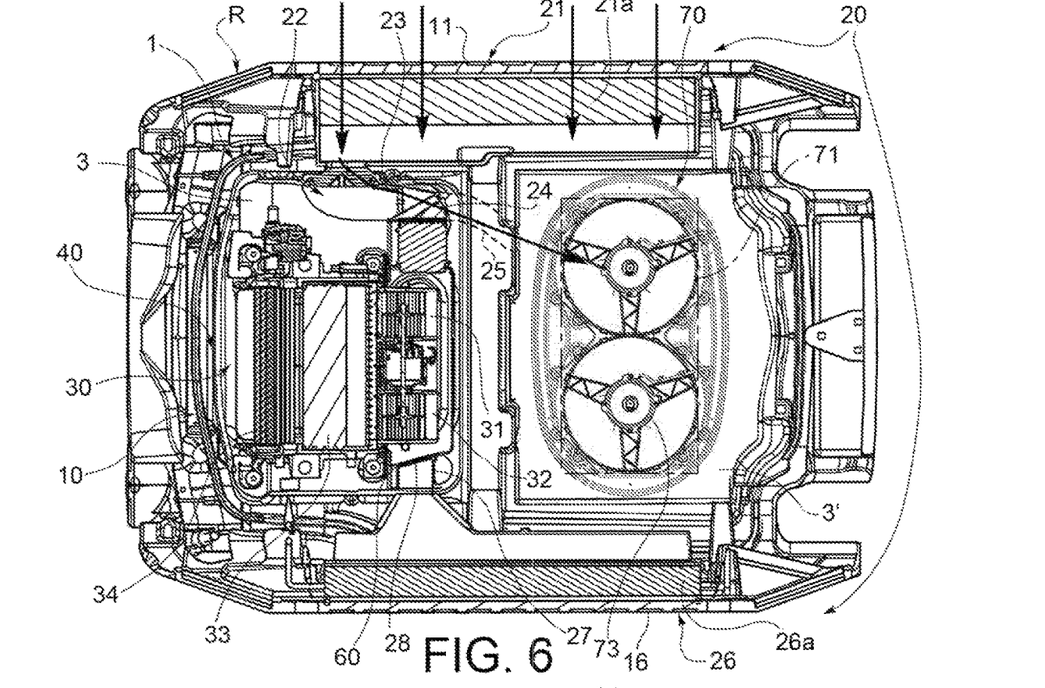
FIGS. 6 to 10 are sectional views of the roof, showing different operating configurations of the treatment apparatus.

With reference to FIGS. 4 and 6, the filtration system 20 comprises a filter 21 for effecting a filtration of at least one among dust, aerosols and vapours, arranged at the first air inlet 11, and an air inlet duct 23 being arranged directly connected downstream of the filter 21 and inside the box 1, and connecting the filter 21 to the HVAC system 30.

An equivalent hole (not shown) is conventionally provided inside the cabin to adjust the pressurization of the environment inside the cabin.

With reference to FIG. 4, the filter 21 comprises a filter box 21a and a filter body 21b housed inside the filter box 21a. Preferably, the filter body 21b is a filter chosen from among known filters capable of suppressing dust, aerosols and vapours, in other words a filter of category 4 according to European Standard EN 15695. An air inlet grille 21c is also mounted at the interface between the first air inlet 11 and the external environment, upstream of the filter body 21b. Sealing means 21d are interposed between the air inlet grille 21c and the air inlet of the filter box 21a. A shutter device 21e is placed at the air inlet grille 21c, this device being of the type biased towards a closed position and openable by a pressure downstream of the shutter device 21e lower than the pressure of the external environment. In the illustrated example, the shutter device 21e consists of a plurality of fins of elastic material, which bend towards the inside of the box 1, thereby opening the first air inlet 11, when the pressure downstream of the fins is lower than the pressure of the external environment.

The filter box 21a is fixed to the box 1, and its outlet is connected to the air inlet duct 23.

The duct 23 is provided with an air distribution valve 24, shown schematically in FIGS. 6 to 10, whereby the first air inlet 11 is in selectively enabled or disabled communication with the HVAC system 30, as explained subsequently. By means of the duct 23 and the air distribution valve 24, the air inlet 11 is further connected to a cleaning duct 25 connected to a fan of the condensation system 70 and provided for cleaning the filter 21, as will be explained subsequently. In the example shown, the valve 24 is configured to close/open the inlet to the HVAC system 25 and at the same time open/close the inlet to the fan of the condensation system 70. According to alternative embodiments (not shown), provision may be made of a valve dedicated only to the HVAC system, and a valve dedicated to the fan of the condensation system, the operation of which in terms of opening/closing is coordinated.

Figure 5:
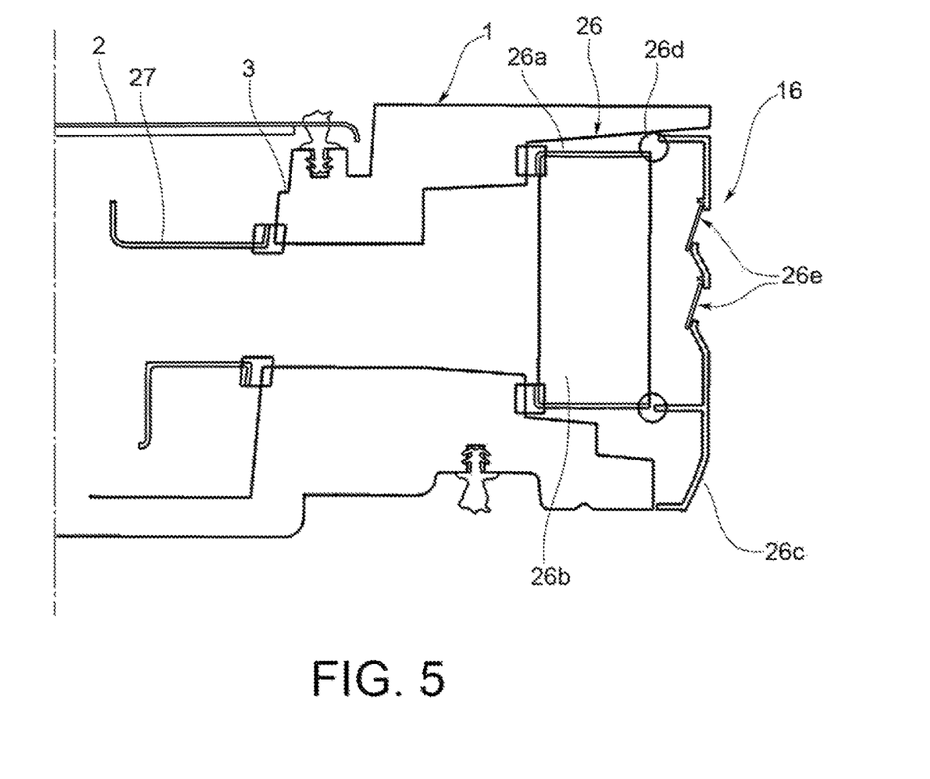
FIG. 5 is a sectional view of a second external air inlet of the treatment apparatus.

With reference to FIGS. 5 and 6, the filtration system 20 can further comprise a second filter 26 for effecting a mechanical filtration of the dust, placed at the second air inlet 16.

With reference to FIG. 5, the second filter 26 comprises a filter box 26a and a filter body 26b housed inside the filter box 26a. Preferably, the filter body 26b is a filter of category 2 according to European Standard EN 15695, and is therefore of a lower category than the first filter 21. An air inlet grille 26c is also mounted at the interface between the second air inlet 16 and the external environment, upstream of the filter body 26b. Sealing means 26d are interposed between the air inlet grille 26c and the air inlet of the filter box 26a. A shutter device 26e is placed at the air inlet grille 26c, this device being of the type biased towards a closed position and openable by a pressure downstream of the shutter device 26e lower than the pressure of the external environment. In the illustrated example, the shutter device 26e consists of a plurality of fins of elastic material, which bend towards the inside of the box 1, thereby opening the second air inlet 16, when the pressure downstream of the fins is lower than the pressure of the external environment.

The filter box 26a is fixed to the box 1, and its air outlet is connected in a sealed way to a passage formed through a wall of the box 1, which, at its inner end, is connected in a sealed way via a duct 27 to the inlet of the HVAC system 30.

The duct 27 is provided with an air distribution valve 28, shown schematically in FIGS. 6 to 10, whereby the first air inlet 16 is in selectively enabled or disabled communication with the HVAC system 30, as explained subsequently. The external air inlet 16 is also connected through the duct 27 and the air distribution valve 28 to the internal environment of the box 1 in order to keep the second filter 26 under pressure, as explained subsequently.

The HVAC system 30 is of a conventional type; fresh and recycled air to be supplied to the cabin C is dehumidified and brought to the desired temperature by means of this system. In a conventional way, the HVAC system 30 may comprise an air mixing plenum 31, one or more fans 32 (visible in FIGS. 6 to 10), an evaporator 33, and a heater 34.

Figure 3:
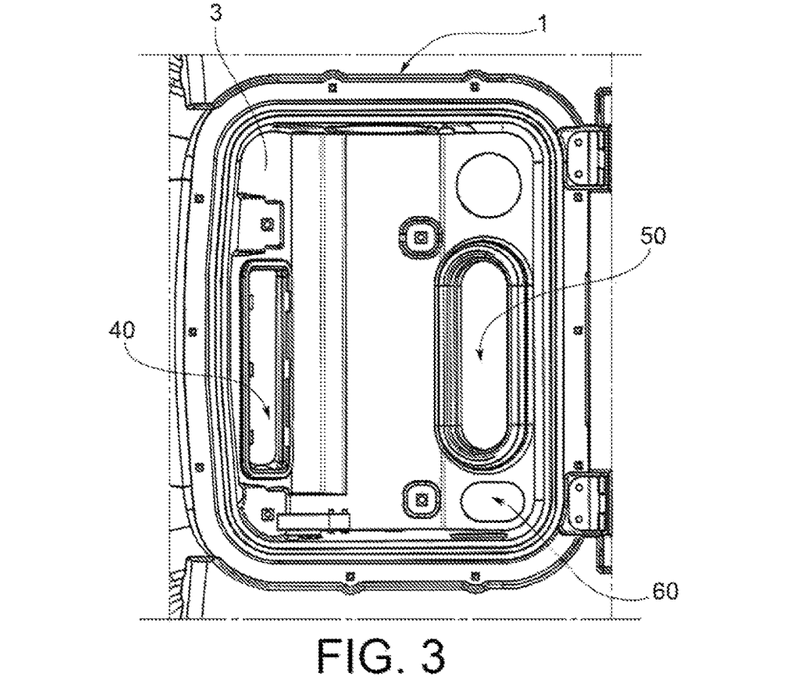
FIG. 3 is a plan view of the part shown in FIG. 2, with the treatment apparatus also removed.

The cabin C is also connected to the air mixing plenum 31 of the HVAC system 30 through an air recycling opening 50 formed on the box 1, visible in FIG. 3.

The box 1 also has a levelling opening 60, visible in FIG. 3, for placing the internal space 3 of the box 1 into communication with the cabin C to level the pressure inside the box 1 with the pressure inside the cabin C.

The condensation system 70, arranged inside the second compartment 3' of the roof R, conventionally comprises one or more condensers 71 and one or more fans 73 associated to the condensers 71. The condenser(s) 71 is/are conventionally connected to the evaporator(s) 33 of the HVAC system 30, within a cooling fluid circuit, and the fan(s) 73 serve to cool/condense the cooling fluid within the condenser(s) 71. The cleaning duct 25 is connected to an air inlet of the fan(s) 73.

The operation of the individual components of the apparatus according to the invention and the monitoring of the pressure and HVAC conditions within the cabin C are controlled by an electronic control unit (not shown).

With reference to FIGS. 6 to 10, different operating configurations of the air treatment apparatus according to the invention will now be illustrated.

FIG. 6 shows a cleaning configuration, which may be adopted when the apparatus is started up. In this configuration, the distribution valve 24 associated with the duct 23 connecting the first external air inlet 11 to the HVAC system 30 is positioned so as to disable the communication between the first external air inlet 11 and the HVAC system 30, and to enable the communication between the first external air inlet 11 and the cleaning duct 25. The distribution valve 28 associated with the duct 27 connecting the second external air inlet 16 to the HVAC system 30 is positioned so as to disable the communication between the second external air inlet 16 and the HVAC system 30. The unnumbered arrows depicted in FIG. 6 represent the air path created by this configuration. The air entering from the air inlet 11, having been drawn in by the fan 73 of the condensation system 70, is used to remove any deposits within the first filter 21 and to discharge them to the outside through an air outlet of the condensation system 70.

Figure 7:
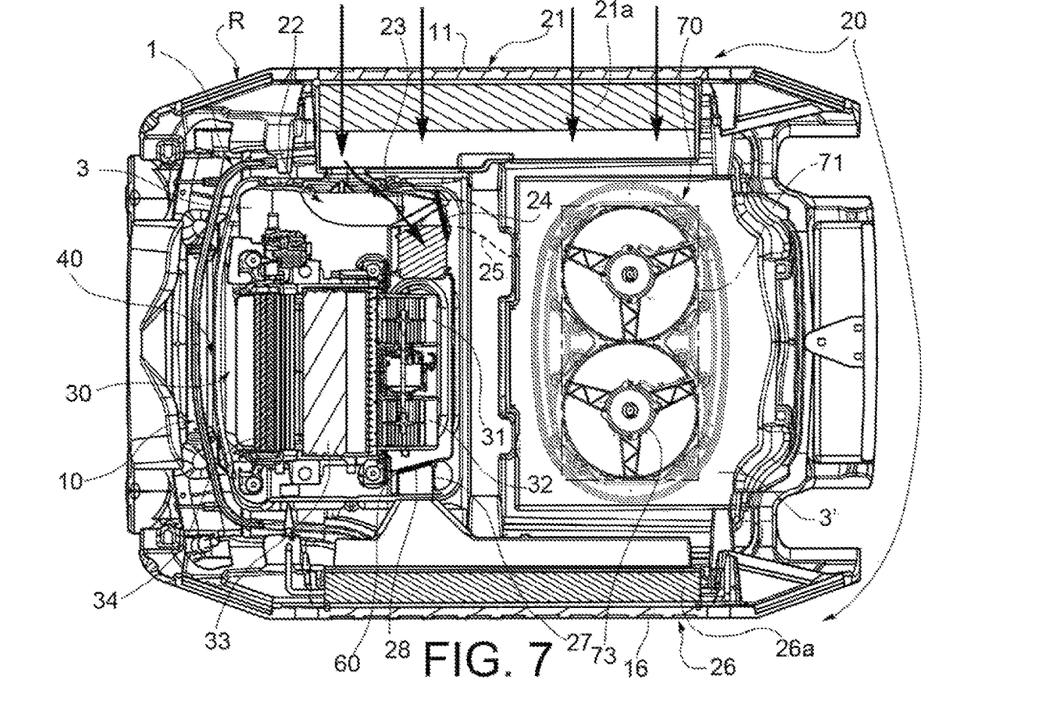

FIG. 7 shows a configuration of initial pressurization of the apparatus. In this configuration, the distribution valve 24 associated with the duct 23 connecting the first external air inlet 11 to the HVAC system 30 is positioned so as to enable the communication between the first external air inlet 11 and the HVAC system 30, and to disable the communication between the first external air inlet 11 and the cleaning duct 25.

The distribution valve 28 associated with the duct 27 connecting the second external air inlet 16 to the HVAC system 30 remains in the position which prevents communication between the second external air inlet 16 and the HVAC system 30. The unnumbered arrows depicted in FIG. 7 represent the air path created by this configuration. The air entering from the air inlet 11, having been drawn in by the fan 32 of the HVAC system 30, passes through the first filter 21 and the HVAC system 30, and then through the cabin air supply outlet 40 to pressurize the cabin C.

Figure 8:
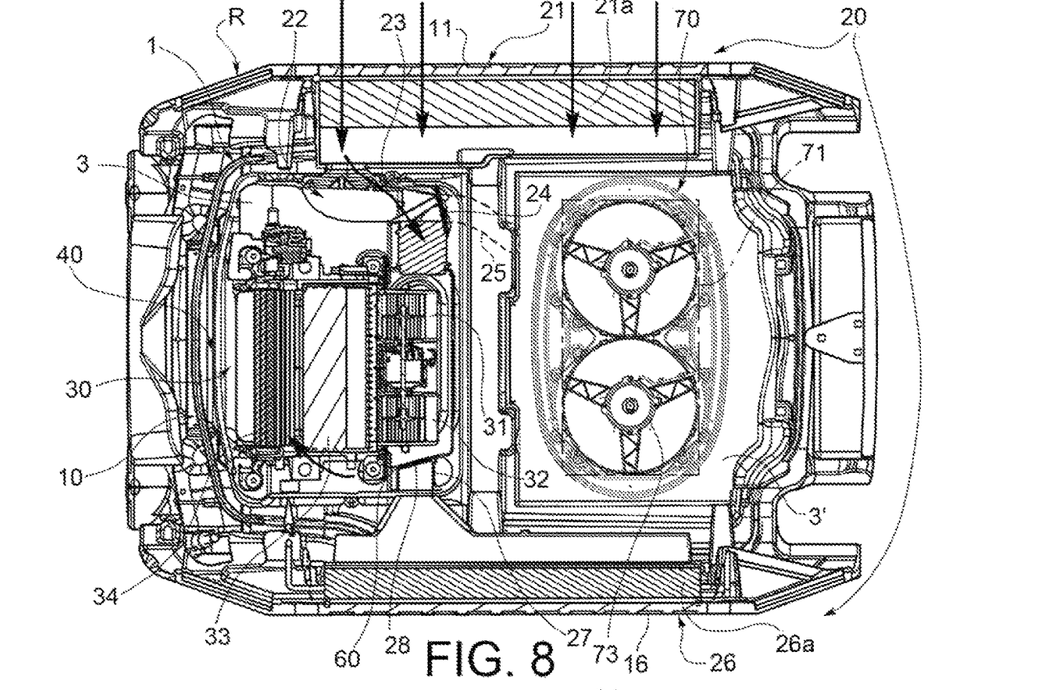

FIG. 8 shows a configuration of steady-state pressurization of the apparatus. In this condition, the distribution valve 24 associated with the duct 23 connecting the first external air inlet 11 to the HVAC system 30 remains in the position which allows communication between the first external air inlet 16 and the HVAC system 30, and the distribution valve 28 associated with the duct 27 connecting the second external air inlet 16 to the HVAC system 30 remains in the position which prevents communication between the second external air inlet 16 and the HVAC system 30. This position of the distribution valve 28 also allows communication between the second external air inlet 16 and the internal space 3 of the box 1. The unnumbered arrows depicted in FIG. 8 represent the path of the air. The air which continues to enter the cabin C along the path indicated above with reference to FIG. 7 also passes from the cabin C into the space 3 within the box 1, through the levelling opening 60, so that it also pressurizes the interior of the box 1, and passes from the space 3 into the duct 27 in communication with the space 3, so that it also pressurizes the second filter 26.

Figure 9:
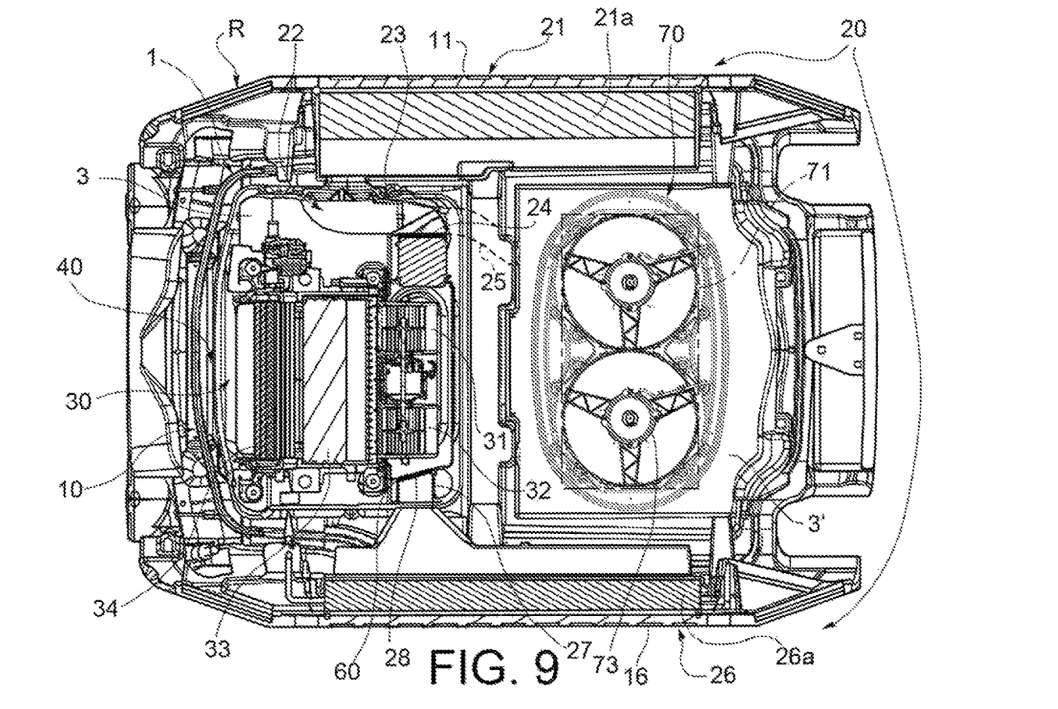

FIG. 9 shows a configuration of anomaly detection in the apparatus. In this condition, the distribution valve 24 associated with the duct 23 connecting the first external air inlet 11 to the HVAC system 30 is positioned so as to disable the communication between the first external air inlet 11 and the HVAC system 30, and the distribution valve 28 associated with the duct 27 connecting the second external air inlet 16 to the HVAC system 30 is positioned so as to disable the communication between the second external air inlet 16 and the HVAC system 30. In this way, external air is prevented from entering the cabin C through the two external air inlets 11, 16.

Figure 10:
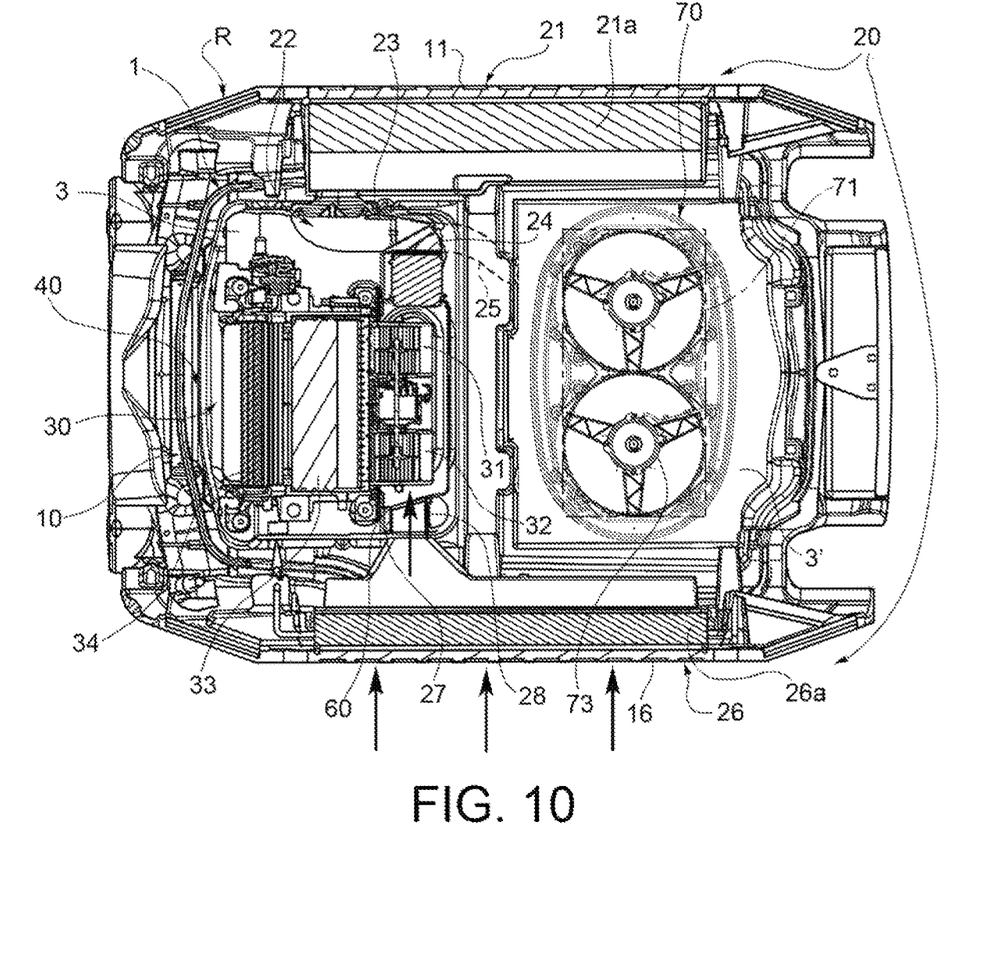

FIG. 10 shows an operating configuration with the lower category filter associated with the second external air inlet. This configuration may be used as an alternative to the higher category operating configuration (shown in the preceding figures) when the operating conditions do not require a high degree of protection against contaminants. In this configuration, the distribution valve 24 associated with the duct 23 connecting the first external air inlet 11 to the HVAC system 30 is positioned so as to disable the communication between the first external air inlet 11 and the HVAC system 30, and the distribution valve 28 associated with the duct 27 connecting the second external air inlet 16 to the HVAC system 30 is positioned so as to enable the communication between the second external air inlet 16 and the HVAC system 30. The unnumbered arrows depicted in FIG. 10 represent the air path created by this configuration. The air entering from the air inlet 16, having been drawn in by the fan 32 of the HVAC system 30, passes through the second filter 26 and the HVAC system 30, and then through the cabin air supply outlet 40 to pressurize the cabin C. The air which continues to enter the cabin C also passes from the cabin C into the space 3 within the box 1, through the levelling opening 60, so that it also pressurizes the interior of the box 1.

The invention claimed is:

1. Cabin air treatment apparatus for an agricultural machine, comprising:
   at least one external air inlet,
   a filtration system connected downstream of the at least one external air inlet,
   an HVAC system connected downstream of the filtration system,
   a cabin air supply outlet connected downstream of the HVAC system,
   a condensation system comprising a condenser connected to an evaporator of the HVAC system, and a fan associated to the condenser,
   a hermetically closed box inside which the HVAC system is housed, said box having a leveling opening for placing the box into communication with a cabin of the agricultural machine to level an air pressure inside the box with an air pressure inside the cabin,
   wherein said at least one external air inlet comprises a first external air inlet formed on the box,
   wherein the condensation system is arranged outside of said box, and
   wherein the filtration system comprises:
   a filter for effecting a filtration of at least one among dust, aerosols and vapors, arranged at the first external air inlet, and
   an air inlet duct directly connected downstream of the filter and provided with a selecting valve having a first outlet fluidically connected to the HVAC system, and a second outlet fluidically connected to the fan of the condensation system, through a cleaning duct, and wherein the air inlet duct provides a direct fluid communication between the filter and the selecting valve, such that the fan is configured to pull air sequentially through the filter, the air inlet duct, the selecting valve, and the cleaning duct.

2. Apparatus according to claim 1, wherein said at least one external air inlet further comprises a second external air inlet formed on the box, wherein the filtration system further comprises a second filter for effecting a mechanical filtration of dust, arranged at the second external air inlet, and wherein the second external air inlet is in selectively enabled or disabled communication with the HVAC system.

3. Apparatus according to claim 2, wherein when the second external air inlet is in condition of disabled communication with the HVAC system, the second filter is placed into communication with an inside of the box to level an air pressure at the second filter with the air pressure inside the box.

4. Apparatus according to claim 2, wherein each of said first external air inlet and second external air inlet is provided with a respective obturating device which is biased toward a closed position and openable with an air pressure downstream of the obturating device lower than an external air pressure.

5. Apparatus according to claim 1, wherein said box and said condensation system are adapted to be arranged at a roof of the agricultural machine, above said cabin.

* * * * *

UNITED STATES PATENT AND TRADEMARK OFFICE
CERTIFICATE OF CORRECTION

PATENT NO. : 11,179,993 B2  
APPLICATION NO. : 15/559563  
DATED : November 23, 2021  
INVENTOR(S) : Massimo Davter Page 1 of 1

It is certified that error appears in the above-identified patent and that said Letters Patent is hereby corrected as shown below:

On the Title Page (72) Inventors reads:  
"Massimo Davter, Turin (IT); Leone Contento, Turin (IT)"  
Should read:  
--Massimo Davter, (Poirino) Torino (IT); Leone Contento, (Poirino) Torino (IT)--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*